United States Patent

Selke

[15] 3,640,439
[45] Feb. 8, 1972

[54] DEVICE FOR ADVANCING AN ENDLESS WEB OF FLEXIBLE STRIP MATERIAL

[72] Inventor: Lynn A. Selke, Fairport, N.Y.
[73] Assignee: Eastman Kodak Company, Rochester, N.Y.
[22] Filed: Feb. 6, 1970
[21] Appl. No.: 9,173

[52] U.S. Cl. ................................................. 226/32
[51] Int. Cl. ....................................... B65h 23/18
[58] Field of Search ..................... 226/27, 32, 28, 30

[56] References Cited

UNITED STATES PATENTS

| | | | |
|---|---|---|---|
| 2,653,508 | 9/1953 | Whiteley | 226/32 X |
| 2,678,821 | 5/1954 | Masterson | 226/30 |
| 3,028,064 | 4/1962 | Thurlings | 226/30 |
| 3,248,029 | 4/1966 | Money | 226/32 X |

*Primary Examiner*—Richard A. Schacher
*Attorney*—Milton S. Sales and Robert W. Hampton

[57] ABSTRACT

An advance mechanism for an endless web of flexible strip material utilizes a flexible, transparent carrier belt having a web-receiving channel therein. The web is trapped in the channel and is supported by the belt as it is moved thereby through the transducer area. A circuit for controlling the belt advance, and thereby the web advance, includes a differential optical detector for observing the position of a reference mark on the web after the web has been advanced. Deviation from the desired position of the mark causes the generation of an error signal which in one embodiment actuates the advance mechanism to correct the error. In another embodiment, the error signal is used to cause the following advance step to be either greater or lesser than normal depending upon the direction of deviation.

9 Claims, 6 Drawing Figures

PATENTED FEB 8 1972 3,640,439

LYNN A. SELKE
INVENTOR.

BY Milton S. Sales
Robert W. Hampton
ATTORNEYS 3,640,439

LYNN A. SELKE
INVENTOR.

BY *Milton S. Sales*

*Robert W Hampton*
ATTORNEYS

DEVICE FOR ADVANCING AN ENDLESS WEB OF FLEXIBLE STRIP MATERIAL

BACKGROUND OF THE INVENTION

1. Field of the Invention

This invention relates to a control circuit and more particularly to a circuit for controlling the advance of nonperforated endless webs of strip material.

2. Description of the Prior Art

In motion picture projectors, it is customary practice to drive, or advance, the film by suitably driven sprocket wheels and/or an intermittently operated film claw, perforations being provided in one or both edges of the film which are engaged by the sprocket teeth and/or claw. While these types of advance mechanisms obviously have been generally successful, nonetheless, they have involved certain inherent disadvantages. For example, the perforations in the film tend to weaken the material and render it liable to tearing, shrinkage of the film renders accurate projection difficult and, in the instance of sound picture film, distortion is apt to arise from sprocket hole modulation and film slippage during printing of the soundtrack. Of course these difficulties are greatly multiplied when ultrathin film or tape is being used (in ensuing description the terms "film" and "tape" are used interchangeably and the term "web" is used generically thereto).

As a move toward alleviation of difficulties of the nature just referred to involved in the use of sprocket wheel drive mechanisms, so-called "sprocketless" or "nonperforated" film or tape is now being used in increasing quantity. In many cases the film or tape is of ultrathin material since the weakening effect of sprocket holes is no longer a factor.

It has been necessary, of course, to develop new methods of driving these sprocketless webs; one such method involves provision of a driven belt which engages the web and advances it by virtue of the frictional contact between the moving belt and the web. A major difficulty encountered in the use of most such types of drives used in connection with sprocketless webs arises from the fact that the web is not consistently advanced the exact amount each intermittent step with the result that the respective frame (in the case of motion picture films) will fail to be exactly centered at the optical station. Various expedients have been introduced in an attempt to overcome this difficulty; for example, there is disclosed in U.S. Pat. No. 3,248,029 issued Apr. 26, 1966, to J. B Money an arrangement whereby the film is first advanced by a distance less than nominal interframe spacing after which the film is advanced in a series of small incremental steps until a detector determines that the film is properly positioned. Obviously, advantages over a multistep arrangement would be inherent in a "single-step" advance mechanism.

SUMMARY OF THE INVENTION

Accordingly, it is an object of my invention to provide a device for advancing nonperforated film accurately and efficiently.

Another object of my invention is to assure proper frame centering of nonperforated film as it is advanced intermittently.

In accordance with a preferred embodiment of the invention the web is first advanced by suitable means, for example by frictional engagement with a driven belt, a distance intended to be equal to the nominal interspace distance of the web. A differential optical detector is then activated to observe the position of a respective one of the reference marks provided on the web whereby to determine whether the web has been advanced the exact desired distance or whether the advance is greater than, or less than, the desired amount. In the event a deviation from the desired amount is detected, an error signal is generated effective to cause the next advancement to be either a greater or a lesser amount depending upon the direction and magnitude of the deviation. Web position tends to be continually corrected in a gross fashion over several frames.

Accordingly, a feature of the invention is means for changing the degree of web advancement in response to an error signal having characteristics depending upon direction and amount of position deviation of the preceding advancement step.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENTS

Figure 1:
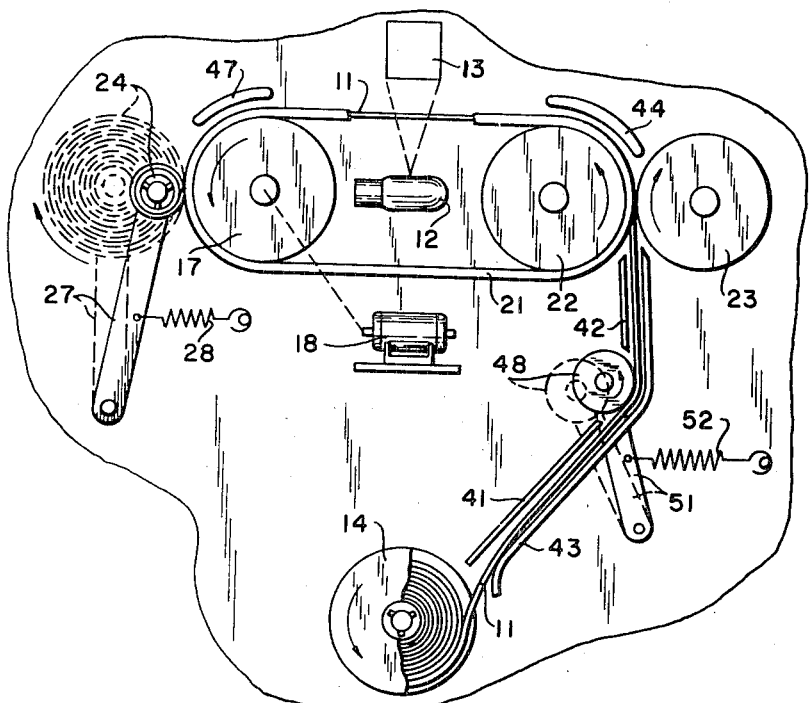
FIG. 1 is a schematic view of an endless web advancing mechanism.

Referring now to the drawing, and first to FIG. 1, there is shown an arrangement for moving an elongated web of flexible strip material 11 such as ultrathin film or tape past an optical station represented by a light source 12 and an optical pickup 13. The arrangement shown is as contemplated by a specific illustrative embodiment of the invention; it being understood that in the event the specific application is that of a motion picture film projector, a film gate of usual construction will ordinarily be provided as a part of the optical station. In the embodiment shown, a supply of strip material 11 is contained in a cassette 14 of suitable arrangement; lateral position control of the cassette may be provided to assure proper alignment of the web. Web 11 may be provided at its free end with a relatively thick leader portion (not shown) for facilitating threading and to assure proper initial alignment of the web.

Figure 3:
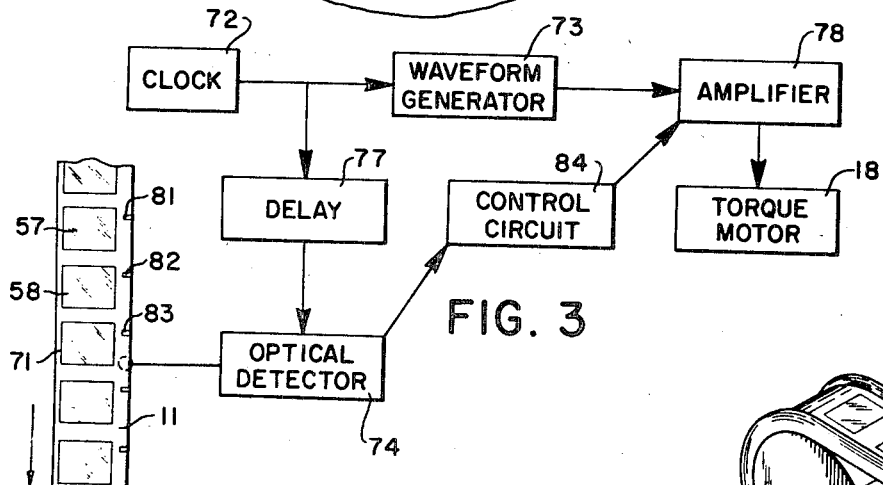
FIG. 3 is a block schematic of one embodiment of the drive control system.

A drive roller 17 is intermittently driven by a torque motor 18 in a manner hereinafter described in detail with particular reference to FIG. 3. A flexible belt 21 of suitable transparent material is guided about drive roller 17 and a companion following roller 22; thus, as roller 17 is driven by motor 18, roller 22 is driven in the same direction by virtue of the belt connection. While rollers 17 and 22 are normally driven in a counterclockwise direction as indicated by the arrows shown thereon, the rollers may be also rotated very short distances in a clockwise direction on occasion for position correcting purposes.

It will be noted that a follower roller 23 is positioned in frictional contact with belt 21 as it passes around roller 22 whereby roller 23 is driven in a direction opposite to that of roller 22. Similarly, a takeup device such as roll 24, which may be of the type shown in U.S. Pat. No. 3,370,803 to C. W. Newell or a conventional reel, is positioned in frictional contact with belt 21 as it passes around drive roller 17 whereby roll 24 is driven in a direction opposite to that of roller 17. Takeup roll 24 is rotatably supported on a pivoted arm 27 which is biased in a clockwise direction by a spring 28. The roll may be linearly movable as shown in the Newell patent.

Guide and protective members 41, 42, and 43 are provided for web 11 as it is moved from supply cassette 14 to position for engagement with transparent belt 21. Similar guarding members 44 and 47 are provided in the area of respective rollers 22 and 17.

Figure 2:
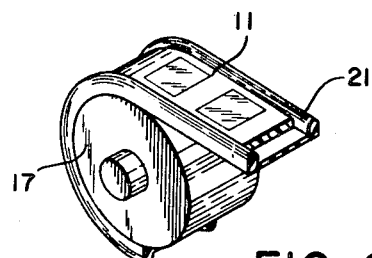
FIG. 2 is an enlarged pictorial view of the drive roller, belt and web of FIG. 1 showing particularly the relationship between the web and the advancing mechanism.

As web 11 is taken from supply cassette 14, it is passed around a loop former 48 which is rotatably supported on a pivoted arm 51; the assembly being balanced by a spring 52 so that the roller, in effect, has a very small mass with respect to the tape. The free end of web 11, preferably provided with a relatively thick leader portion as pointed herein before, is positioned in the web receiving channel of belt 21 just before the point of engagement between the belt and following roller 23. As shown particularly in FIG. 2, web 11 is snugly engaged in the receiving channel provided in transparent belt 21 and, as the belt is advanced intermittently by torque motor 18, web 11 is correspondingly advanced in intermittent steps.

Assuming that web 11 is a motion picture film, when a particular frame reaches the optical station and has been properly centered therein, light from source 12 will be passed through the film either for activation of transducer 13 or for projection. The passage of light through the film is for all practical purposes unrestricted by the presence of the belt 21 since the belt is formed of a transparent material. At the same time, however, the belt is effective not only as a positive driving means for the thin fragile web but also as a protective means for the web particularly as it passes through the optical station. As clearly shown in FIG. 2, the side ridges which define the web receiving channel of belt 21 extend sufficiently to fully encompass the thickness of the web and to adequately protect it during its advancement. The small varying pressure exerted against web 11 by loop former 48 is effective to compensate for changes in acceleration of the tape produced by the driving rollers.

Referring now for the moment to FIG. 3, it will be assumed again that web 11 is motion picture film which is provided with spaced frames, as frames 57, 58 and 71, and that the film is to be advanced in intermittent steps so that each frame is successively centered in the optical station. A dual mode servo as shown in FIG. 3 accomplishes this advance in a manner described below.

The starting mode of the servo, that is, mode 1 is open loop. A clock 72, of conventional type, supplies control signals at predetermined intervals corresponding to the desired frame rate. For example, assuming that the desired rate of film movement is 20 frames per second, then clock 72 may send control signals at a rate of 20 per second. When the first control signal is emitted by clock 72, this signal is transmitted directly to a wave form generator 73. (As just stated, the servo is operating in mode I wherein transmission of the actuating signal to an optical detector 74 is delayed by a delay device 77.) Waveform generator 73, activated by the control signal from clock 72, supplies a voltage wave to an amplifier 78; after amplification, the voltage wave is applied to torque motor 18 (see also FIG. 1) to cause the motor to rotate drive roller 17 and advance belt 21 and film 11 sufficiently to bring the next succeeding frame into registry with, or substantially in registry with, the optical station.

Figure 4:
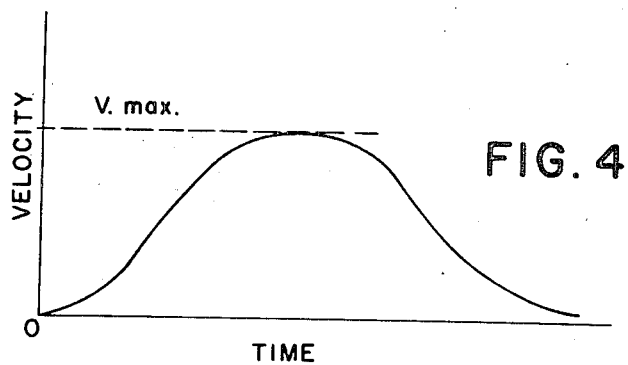
FIG. 4 is a plot of the time-velocity relationship of the web movement controlled by the system of FIG. 3.

The velocity profile for mode I belt advance is represented by the curve of FIG. 4 and it will be observed that the velocity of the belt movement gradually builds up to V. max. and then it gradually drops to zero; the velocity profile is chosen to minimize film stress and acoustical noise. For a typical drive mechanism, the maximum velocity V. max. would be so chosen that mode I advance will take place in about 5 milliseconds; the total advance for each clock signal during this mode is intended to be equal to the nominal interframe spacing.

Now after an interval determined by the characteristics of delay device 77, the control signal previously emitted by clock 72 is applied to optical detector 74 and the positioning servo goes into mode II, a closed loop mode.

It will be observed that film 11 is provided with a reference mark for each frame, such as reference mark 81 for frame 57, reference mark 82 for frame 58, and reference mark 83 for frame 71. As the delay pulse from clock 72 is now applied to optical detector 74 for activation thereof, the optical detector acts to sense the deviation, if any, of the respective reference mark, for example reference mark 82, from the position prevailing when the respective frame is properly centered in the optical station; assuming proper operation of the servo in mode I, the deviation indicated, if any, will be only minute.

In the event a deviation from proper centering position is detected by optical detector 74, an error signal will be transmitted to control circuit 84; control circuit 84 will respond to the error signal by transmitting a pulse to amplifier 78 of proper duration whereby torque motor 18 will be driven by amplifier 78 the exact distance required for the desired vernier adjustment of belt 21 and the film 11 carried thereby. During the adjustment of the film position, proper tension will be maintained therein by action of looper roller 48; the buffer action of this roller assembly, having a small applied mass, is effective in avoiding any sudden stresses in the tape so that starting and stopping effects are not critical and accelerations can be greater than would otherwise be permissible.

It will be obvious that the novel arrangement of a driving belt of transparent material permits use of the web in an optical system where unrestricted passage of light through the web at the optical station is necessary. The web is essentially supported at all points in the drive portion of the advance system and acceleration and/or speed reduction at very high rates is feasible even with ultrathin film. Since the web is protected by the shoulders provided at the edges of the belt, that is, the shoulders which define the web receiving channel, the web is kept free of the effect of the usual wear producing forces such as contact with the projection gate.

It will be understood that the belt may be driven continuously, other than intermittently as disclosed, if suitable modifications are made in the optical station. Also, the spring-loaded takeup roll may be replaced by a following roller and the takeup reel isolated from the advance mechanism.

Figure 5:
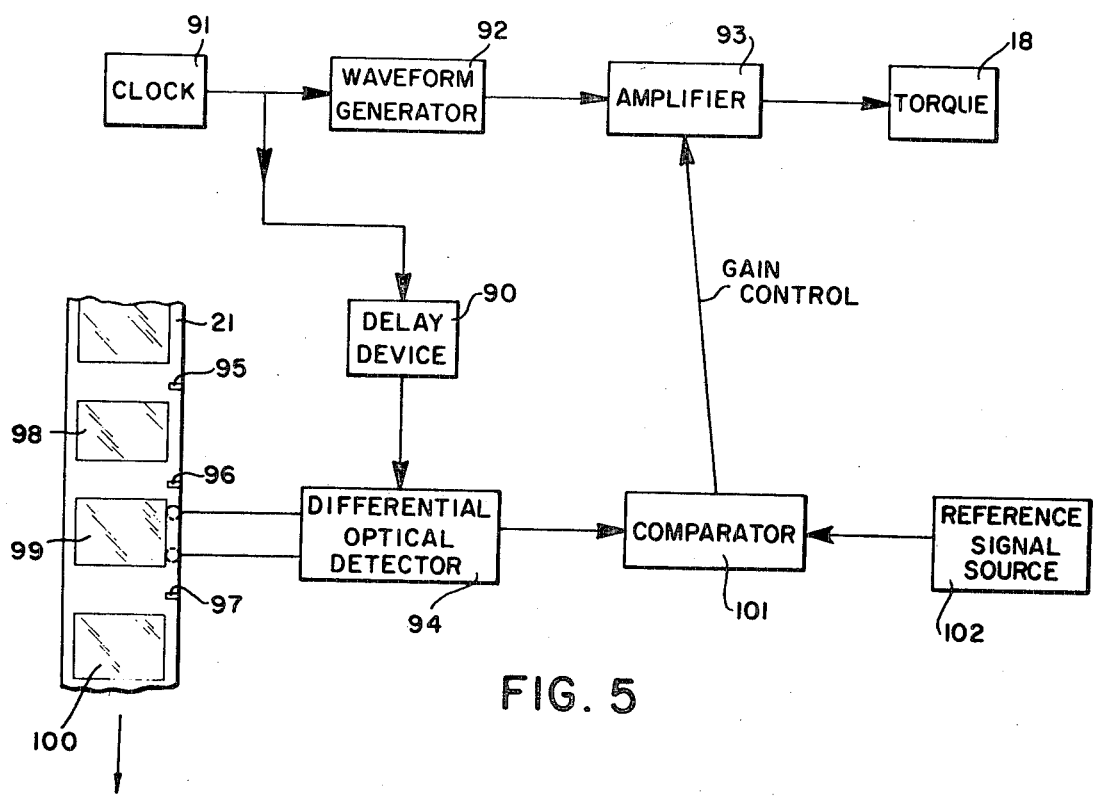
FIG. 5 is a block schematic of another embodiment of the drive control system.

Referring now to FIG. 5, another embodiment of a servo circuit is shown for control of torque motor 18 which operates belt 21 for advancing web 11 in intermittent steps.

Due to the inclusion of a delay device 90 in a leg of the control circuit, the circuit, in effect, operates in two modes. Mode I being open loop and mode II being closed loop. A clock 91 transmits control signals at a predetermined fixed rate depending upon the desired rate of frame advance. For example, assuming that it is desired that the film be advanced at a rate of 20 frames per second, clock 91 will then be adjusted to transmit control signals at a rate of 20 per second.

At the start of a first mode, a control signal transmitted by clock 91 activates a waveform generator 92 which, in turn, is operated to transmit a waveform to an amplifier 93. Drive motor 18 is operated by the output from amplifier 93 at a predetermined rate and time intended to advance film 21 exactly one frame.

Figure 6:
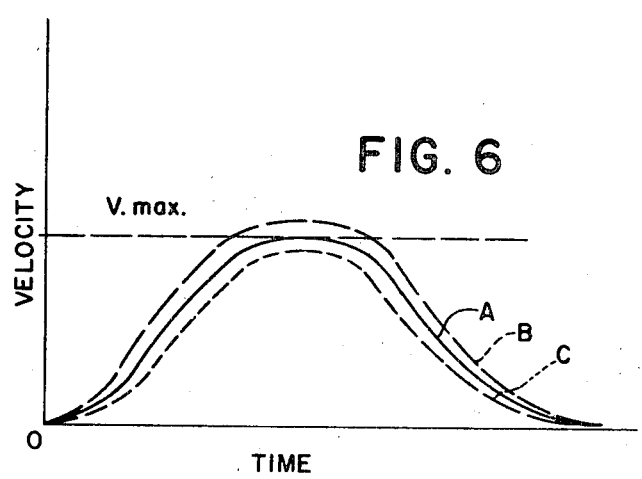
FIG. 6 is a plot of the time-velocity relationship of the web movement controlled by the system of FIG. 5.

Referring for the moment to FIG. 6, the solid line curve A represents the intended advance rate of the web, and it will be noted that the velocity of web movement builds up gradually to V. max. and then gradually drops off to zero. The velocity profile is chosen to minimize film stress and acoustical noise. For a typical drive mechanism, the maximum velocity, V. max., may be so chosen that the advance step will take place in about 5 milliseconds.

As the control signal, delayed by device 90, is subsequently applied to a differential optical detector 94 for initiation of mode II operation, the optical detector is activated to sense the position of a respective reference mark, such as marks 95, 96 and 97, on film 21. The sensed position of a mark will indicate whether the associated frame 98, 99 and 100, respectively, has been exactly positioned in the optical station. (Assuming proper mode I operation of the circuit, deviation of the frame position from the desired point will be at most only minute.)

Differential optical detector 94, operating in a manner well understood in the art, will now transmit to a comparator 101 a signal indicating whether the frame position sensed indicates proper film advance, insufficient advance, or too great an advance. In other words, detector 94 senses whether film 21 has been advanced a distance greater than, equal to, or less than the interframe spacing. At the same time, there is applied to comparator 101 in the opposite direction a reference signal from a source 102 which has fixed predetermined characteristics indicative of the proper film advance. Accordingly, if the signal applied to comparator 101 by optical detector 94 is also of this same magnitude, that is, if proper frame position has been sensed, the two signals will cancel out and no error signal will be transmitted over a leg 103 to power amplifier 93 whereby to change the gain thereof. The next film advance, when a subsequent clock signal is transmitted, will be the same as the previous advance therefor.

Assuming now, however, for purposes of further description that differential optical detector 94 had sensed that the film advance was, in fact, insufficient for proper film positioning at the optical station, a "minus position" signal will be transmitted to comparator 101. When this signal is compared with the reference signal from source 102, a "difference" or "error" signal is produced and transmitted over leg 103 to amplifier 93. This signal is of a nature which is effective to operate the amplifier gain control whereby to 93. Consequently, as a second control signal is emitted by clock 91 initiating the next mode I operation, the output from amplifier 93 will be greater than before, drive motor 18 will be driven at a higher velocity, and film 21 will be advanced a greater distance than before. The resulting velocity profile will now be as shown by curve B, FIG. 6, and it will be noted that curve B is generally similar in shape to curve A but that the maximum velocity is slightly higher than that of the previously referred to curve A. Accordingly, the distance traveled by web 21 for this mode I operation of the control circuit will be greater than the distance previously traveled and proper frame position will now be attained or at least more closely approached. It will be understood that complete correction of film position may be extended over several separate advances; the human eye will not be too critical of corrections that take place slowly over several frames.

In the example assumed above, it might have occurred, of course, that optical detector 94 had sensed that film 21 had been advanced too great an amount for exact frame positioning at the optical station; in this case a "plus position" signal would have been transmitted to comparator 101. When this signal is compared with the "standard" signal provided by reference source 102 a "difference" signal is again produced but of opposite polarity to the difference signal referred to above. In this instance, the difference signal, transmitted over leg 103, is effective to decrease the gain of power amplifier 93 and, consequently, the velocity at which torque motor 18 is driven, as the next control signal is transmitted by clock 91, is correspondingly decreased. The resulting velocity profile will be as represented by curve C, FIG. 6, and again it will be noted that the shape of the curve is generally similar to that of curve A, but that here the maximum velocity is slightly less than that of the previously referred to curve A. Accordingly, the distance traveled by web 21 will be less than the distance traveled in the first instance described and proper frame position will now be attained or at least more closely approached.

It will be obvious that the novel control system contemplated by this embodiment, wherein the web position correction, when necessary, is accomplished as an integral part of the regular web advance, offers real advantages over prior systems as discussed hereinbefore.

While the control system has been disclosed particularly in connection with one type of web advance it will be understood that it could be applied in connection with various types of drives. As one example, the servocontrol loop could be utilized to vary the stoke of grippers that were being used to pull a web down intermittently from a free loop.

The invention has been described in detail with particular reference to the preferred embodiments thereof, but it will be understood that variations and modifications can be effected within the spirit and scope of the invention. increase the gain of amplifier 93.

I claim:

1. Apparatus for controlling the intermittent advance steps by a drive motor of a strip of motion picture film having a succession of frames, the steps being such as to successively bring the frames into registry with a transducer station, said apparatus comprising:

means for applying a predetermined electrical potential to the motor to drive the motor at a predetermined velocity pattern;

means effective following an advance step of said film for providing an indication of any resulting deviation of the position of a respective frame relative to a predetermined position of accurate registry; and means controlled by said last-mentioned means and effective upon indication of such a deviation for modifying the action of said electrical potential applying means to cause said motor to be driven at a velocity pattern different from said predetermined pattern during the next advance step of the film.

2. Apparatus for controlling the intermittent advance steps by a drive motor of a strip of motion picture film as defined by claim 1 wherein said modifying means is effective to increase or decrease the electrical potential applied to the motor in response to under travel or over travel, respectively, of the film.

3. Apparatus for controlling the intermittent advance steps by a drive motor of a strip of motion picture film as defined by claim 1 wherein said potential applying means includes a power amplifier and a waveform generator for activating said amplifier.

4. Apparatus for controlling the intermittent advance steps by a drive motor of a strip of motion picture film as defined by claim 3 wherein said means for modifying the action of said electrical potential applying means includes means for changing the gain of said amplifier in response to an indication of deviation from accurate film registration.

5. Apparatus for controlling the intermittent advance steps by a drive motor of a strip of motion picture film as defined by claim 3 further comprising:

means for transmitting intermittent control signals at a predetermined rate corresponding to the desired frame advance rate of the film; and means for applying said control signals to said waveform generator for activation thereof.

6. Apparatus for controlling the intermittent advance steps by a drive motor of a strip of motion picture film as defined by claim 5 wherein:

the film is provided with a series of reference marks for indicating the position of respective frames in the transducer station; and said indication providing means includes an optical detector for determining the position of a respective reference mark after an intermittent advance step of the film.

7. Apparatus for controlling the intermittent advance step by a drive motor of a strip of motion picture film as defined by claim 6 further comprising means for applying signals from said intermittent control signal transmitting means to said optical detector for activation thereof, said signal applying means including means for delaying the application of respective ones of said signals to said optical detector as compared with the application of the same respective signal to said waveform generator.

8. Apparatus for controlling the intermittent advance steps by a drive motor of a strip of motion picture film as defined by claim 6 further comprising:

a reference signal source for transmitting a reference signal having predetermined characteristics representative of a position of accurate registry of a film frame;

signal comparing means; and means for applying in respectively opposite directions to said signal comparing means a signal from said reference signal source and a signal transmitted by said optical detector to obtain a difference signal.

9. Apparatus for controlling the intermittent advance steps by a drive motor of a strip of motion picture film as defined by claim 8 further comprising means for applying the difference signal, if any, resulting from the comparison of signals by said signal comparing means to said means for modifying the action of said electrical potential applying means to increase or decrease the electrical potential applied to the motor.